United States Patent [19]

Duttlinger

[11] 4,284,450
[45] Aug. 18, 1981

[54] METHOD AND DEVICE FOR REPAIRING TUBELESS TUBULAR TIRES FOR BICYCLES

[75] Inventor: Jean Duttlinger, Soissons, France

[73] Assignee: Wolber, Soissons, France

[21] Appl. No.: 102,526

[22] Filed: Dec. 11, 1979

Related U.S. Application Data

[62] Division of Ser. No. 897,774, Apr. 19, 1978, Pat. No. 4,200,009.

[30] Foreign Application Priority Data

May 13, 1977 [FR] France .................... 77 14680

[51] Int. Cl.³ ............................................. B60C 21/00
[52] U.S. Cl. ........................................ 156/97; 81/15.6; 152/367; 152/370
[58] Field of Search .................... 156/94–97; 81/15.6, 15.7, 15.5, 15.2; 152/367, 370

[56] References Cited

U.S. PATENT DOCUMENTS

| | | | |
|---|---|---|---|
| 602,052 | 4/1898 | Brauchler | 81/15.5 |
| 603,045 | 4/1898 | Palmer | 81/15.6 |
| 616,572 | 12/1898 | Herrick | 81/15.6 |
| 671,357 | 4/1901 | Strouse | 81/15.6 |
| 2,928,300 | 3/1960 | Rodgers | 81/15.6 |
| 3,198,039 | 8/1965 | Price | 81/15.6 |

*Primary Examiner*—John E. Kittle
*Attorney, Agent, or Firm*—Wenderoth, Lind & Ponack

[57] ABSTRACT

Repairing of tubeless tires and tubeless covers includes injecting a suitable cement through the puncture hole onto the inner surface of the tire, this injection taking place in two successive steps. A first step involves depositing an annular patch of cement around the hole, and in a second step a pearl of cement is deposited concentrically to the hole. The pearl spreads on the annular patch to form a relatively wide deposit centered on the puncture hole and having a thickness sufficient to constitute, after drying and setting, a real repair patch centered on the puncture.

6 Claims, 4 Drawing Figures

METHOD AND DEVICE FOR REPAIRING TUBELESS TUBULAR TIRES FOR BICYCLES

This is a division of application Ser. No. 897,774, filed Apr. 19, 1978, now U.S. Pat. No. 4,200,009.

BACKGROUND OF THE INVENTION

The present invention relates to a method for repairing bicycle tubular tires, notably of the tubeless type.

It is known that bicycle tubular tires are tires in which a lightweight tube is enclosed in a bias-fabric tires cover consisting of a carcass and a tread. The carcass may be closed in various ways:

by stitching with a sewing machine capable of making different types of stitches;

by using a zip fastener;

by cementing the two edges of the cover during the moulding operation.

While the use of a zip fastener, proposed many years ago but not used commercially for closing tubular tires, may prove extremely convenient for repairing a punctured tires, this is not so for the stitched tires and still less for the cemented closing which cannot admit of any kind of repair.

In the case of a stitched tubular tire, the repair is performed by firstly detaching a protection tape applied over the seam in the punctured area, then cutting the seam threads along a length sufficient to permit the removal from the tire of the inner tube portion which was punctured, and eventually applying a rubber puncture-patch on the hole. Then, after re-inserting the inner tube, the operator must stitch the seam manually along the previously removed portion. This is done by making cross-stitches or herringbone-stitches, and the needle and thread must pass through the holes of the previously cut seam. In addition, the thread must be tightened in such a way that upon completion of the repair operation and refitting the protection tape no throttling nor expansion of the tire remains visible when the latter is refitted on the rim and inflated.

From the foregoing it is clear that all these repair operations are tedious and time-consuming. Except for some retired people and former cycle racers, nowadays nobody is willing to do the job and cyclists must repair their tubular tires themselves.

Of late, various tubeless tubular tires have been proposed commercially (see French Pat. No. 76 10229 filed on Apr. 8, 1976 by the same Applicant), i.e. tubular tires in which the impervious layer retaining the air therein is formed integrally with the cover. As a result, in case of puncture, the hole formed through the tread and the hole formed through the impervious layer remain in mutual alignment, notwithstanding the tire deflation.

To repair this type of tubeless tubular tire the only proposition made up to now consisted in injecting through the valve rubber latex or another emulsion suspension likely to seal the puncture more or less adequately. Considering the random distribution of the product thus injected, this repair method is not always efficient and reliable.

SUMMARY OF THE INVENTION

It is the primary object of the present invention to provide a method of repairing in a simple yet efficient manner tubeless tubular tires for cycles.

According to the method of the invention, a suitable cement is injected through the puncture hole at the level of the inner surface of the tire, this injection being carried out in two steps. During the first step, a substantially annular patch of liquid cement or rubber solution is deposited around the hole, and during the second step a pearl of cement or rubber solution is deposited on the center of the hole, this pearl spreading out on the previously formed patch in order to form therewith a relatively wide deposit centered on the puncture hole and having a suitable thickness so that, when dried, it constitutes a real repair patch centered on the puncture hole.

The method of the invention may be carried out by a device including needle adapted to be fitted directly onto the neck of a cement tube. The needle has a lateral orifice for depositing the substantially annular patch of cement, and another orifice at the end opposite the one communicating with the source of cement for depositing and forming the pearl of cement at the center of the hole, the needle being introduced into the tire through the puncture hole.

BRIEF DESCRIPTION OF THE DRAWINGS

Other features and advantages of this invention will appear from the following description with reference to the accompanying drawings illustrating diagrammatically a typical embodiment of the invention, and wherein.

DETAILED DESCRIPTION OF THE INVENTION

Figure 1:
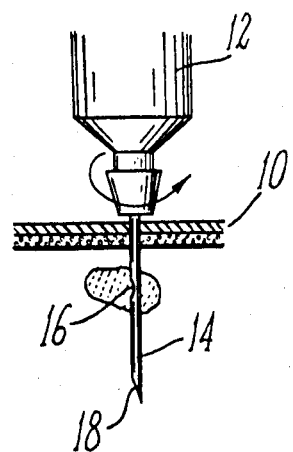
FIGS. 1 to 4 are diagrammatic part-sectional views illustrating the successive positions of a device employed to carry out the method according to this invention during the repair of a puncture in a tubeless tubular tire for a bicycle.

In the drawings, the tubeless tubular tires for a bicycle is designated generally at 10 and comprises essentially an impervious, air-retaining layer and a cover.

A device employed for carrying out the method according to this invention for repairing this tubeless tubular tire in case of puncture comprises essentially a needle 14 having a length and a diameter consistent with the tire and size of tubeless tubular tire to be repaired, this needle 14 being adapted to be fitted either to the outlet end of a syringe filled with liquid cement or rubber, or, as in the exemplary embodiment described herein, directly to the outlet of a tube 12 filled with cement or liquid rubber.

This needle 14 is characterized in that it comprises two orifices for dispensing the cement, namely:

a lateral orifice 16 and an end orifice 18.

The lateral orifice 16 is disposed at a level such that when the needle is driven home as shown in FIG. 1 into the tubeless tubular tire, the orifice 16 is spaced from the inner surface of the tire and inside the latter.

In actual practice, with the sizes of present-day tubeless tubular tires, this lateral orifice 16 shall be located at about 6 mm from the needle end, and the length of the needle is such that this lateral orifice 16 will be located at a distance of about 4 mm from the needle base or outer end.

For repairing a punctured tubeless tubular tire, the operator simply introduces the needle through the puncture hole into the tire, this puncture hole being easily detected from the air escaping therefrom. The needle is driven home so that the lateral orifice 16 emerges into the inner space of the tire and is spaced from the inner surface of the impervious layer thereof (See FIG. 1).

Figure 2:
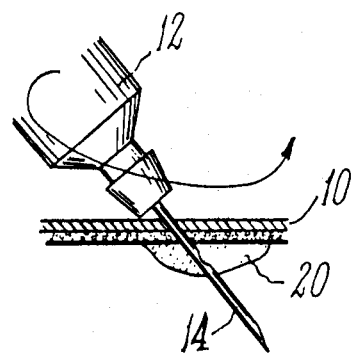

Then the needle (FIG. 2) is inclined in order to reduce the distance between the lateral hole 16 and the inner surface of the tire, this movement being performed by simply inclining the tube of cement held by the operator's hand, whereafter the cement-filled tube 12 provided with its needle 14 is rotated about the axis of the puncture hole while depressing the tube 12. Thus, an annular "patch" 20 of cement or liquid rubber solution is deposited around the hole.

Figure 3:
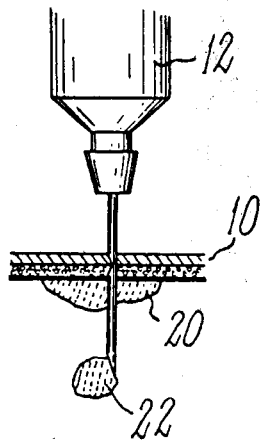

Subsequently, the needle is slightly withdrawn (FIG. 3) while straightening it to a position substantially at right angles to the hole, so that the lateral orifice 16 lies within the thickness of the tire and is eventually sealed by the tire material. The cement-filled tube 12 is squeezed again to cause a drop or pearl 22 of cement or liquid rubber solution to emerge from the needle end orifice 18.

Figure 4:
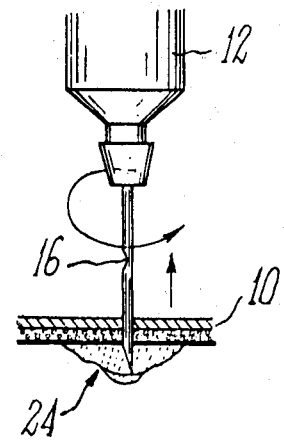

Finally, the needle is withdrawn completely (FIG. 4) from the hole and thus the pearl 22 adheres to the annular patch of cement 20 previously deposited around the puncture hole to constitute a relatively wide deposit 24 centered at the puncture hole and having a thickness sufficient to constitute, when dried, a repair patch covering the punctured area. During the withdrawal of the needle the cement particles still adhering to the needle end are deposited in the puncture hole, thus assisting in sealing the latter.

The repair may be performed while the tubeless tubular tire is still mounted on the rim. Then, the tire is kept under a moderate inflation pressure during a time sufficient to allow the cement or liquid rubber thus deposited to dry and set.

Of course, the method and device described hereinabove may be used for repairing tubeless tires whenever it is desired to repair a tire without removing or stripping it from the wheel rim.

The cement utilized may have any composition suitable for the purpose, i.e. an easily injected, quick-drying solution having a good adherence to the inner wall of the tire.

Of course, this invention should not be construed as being strictly limited to the specific embodiment described and illustrated herein, since many modifications and changes may be brought thereto without departing from the basic principles of the invention as set forth in the appended claims.

What I claim is:

1. A method for repairing a puncture hole in a tubeless tubular tire and a tubeless cover, said method comprising:

providing an elongate hollow injection needle having a first end connectable to a source of cement and a second end adapted to be inserted through saisd puncture hole in said tire, said needle having extending therethrough, throughout the entire length thereof from said first end thereof to said second end thereof, an internal hollow passageway through which cement from the source may be supplied, said needle having at a position intermediate said first and second ends thereof at least one lateral orifice extending through said needle from said internal passageway thereof to the outer surface thereof, and said needle having an end orifice extending through said needle from said internal passageway thereof to the extremity of said second end thereof;

connecting a source of cement to said first end of said needle;

inserting said needle through said puncture hole in said tire to a position such that said lateral orifice is inwardly spaced from the inner surface of said tire;

inclining said needle with respect to a radial line through said puncture hole, thereby bringing said lateral orifice to a position adjacent said inner surface of said tire;

manipulating said source of cement and thereby forcing said cement through said internal passageway and outwardly through said lateral orifice onto said inner surface of said tire, while rotating said needle about the axis of said puncture hole, and thereby depositing on said inner surface of said tire a first quantity of cement in the form of an annular patch surrounding said puncture hole;

partially withdrawing said needle from said puncture hole to a position whereat said lateral orifice is within said puncture hole and is blocked and sealed by the puncture edges of said tire;

manipulating said source of cement and thereby forcing said cement through said internal passageway and outwardly through said end orifice, thereby forming on said second end of said needle a second quantity of cement in the form of a drop at a position aligned substantially centrally of said puncture hole; and completely withdrawing said needle from said puncture hole, and thereby depositing said drop of cement centrally of said puncture hole and causing said drop to join with the center of said annular patch of cement, to thus form on said inner surface of said tire a relatively wide deposit of cement centered on and sealing said puncture hole.

2. A method as claimed in claim 1, wherein said source of cement comprises a cement tube, and said steps of manipulating comprise squeezing said cement tube.

3. A method of repairing a puncture hole in a tubeless tubular tire and a tubeless cover, said method comprising:

inserting an elongated hollow needle through said puncture hole in said tire;

injecting cement through said needle laterally outwardly therethrough at a position intermediate opposite ends thereof, while rotating said needle about the axis of said puncture hole, and thereby depositing on the inner surface of said tire an annular patch of cement surrounding said hole;

thereafter injecting cement through said needle longitudinally outwardly therethrough to form a drop of cement on the inner end of said needle; and withdrawing said needle from said puncture hole and depositing said drop of cement centrally of said puncture hole, such that said drop of cement joins with the center of said annular patch of cement, thus forming on said inner surface of said tire a relatively wide deposit of cement centered on and sealing said puncture hole.

4. A method as claimed in claim 3, further comprising inclining said needle with respect to a radial line through said puncture hole during said rotation of said needle and the formation of said annular patch.

5. A method as claimed in claim 3, further comprising, after the formation of said annular patch and prior to the formation of said drop of cement, partially withdrawing said needle from said puncture hole to a position whereat injection of said cement laterally through said needle is blocked and sealed by the puncture edges of said tire.

6. A method as claimed in claim 3, wherein said steps of injecting comprise connecting a cement tube to an outer end of said needle, and squeezing said tube to thereby force said cement through said needle.

* * * * *